US008670445B2

(12) United States Patent
Xue et al.

(10) Patent No.: US 8,670,445 B2
(45) Date of Patent: Mar. 11, 2014

(54) SCHEDULING METHOD IN A CODE DIVISION MULITPLE ACCESS SYSTEM AND SINGLE-MODE CHIPS

(75) Inventors: Zitao Xue, Guandong (CN); Jian Yang, Guangdong (CN); Min Xu, Guangdong (CN); Cuihong Yang, Guangdong (CN); Chao Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/259,628

(22) PCT Filed: Jul. 12, 2010

(86) PCT No.: PCT/CN2010/007511
§ 371 (c)(1),
(2), (4) Date: Apr. 26, 2012

(87) PCT Pub. No.: WO2011/113246
PCT Pub. Date: Sep. 22, 2011

(65) Prior Publication Data
US 2012/0281543 A1 Nov. 8, 2012

(30) Foreign Application Priority Data
Mar. 18, 2010 (CN) .......................... 2010 1 0138657

(51) Int. Cl.
*H04B 7/216* (2006.01)
(52) U.S. Cl.
USPC .......................... 370/355; 370/342; 455/450
(58) Field of Classification Search
None
See application file for complete search history.

(56) References Cited

U.S. PATENT DOCUMENTS

| | | | |
|---|---|---|---|
| 6,069,880 A * | 5/2000 | Owen et al. | 370/311 |
| 6,216,004 B1 * | 4/2001 | Tiedemann et al. | 455/442 |
| 6,307,846 B1 | 10/2001 | Willey | |
| 6,480,476 B1 * | 11/2002 | Willars | 370/311 |
| 7,212,831 B2 * | 5/2007 | Lee | 455/458 |
| 7,957,352 B2 * | 6/2011 | Vanghi et al. | 370/335 |
| 2001/0034233 A1 * | 10/2001 | Tiedemann et al. | 455/436 |
| 2003/0081216 A1 | 5/2003 | Ebert et al. | |
| 2005/0037746 A1 | 2/2005 | Ramalho et al. | |
| 2009/0131054 A1 | 5/2009 | Zhang | |
| 2009/0305728 A1 | 12/2009 | Huang et al. | |
| 2010/0009716 A1 | 1/2010 | Lee et al. | |
| 2010/0128699 A1 * | 5/2010 | Yang et al. | 370/335 |
| 2011/0090874 A1 * | 4/2011 | Yang et al. | 370/335 |

FOREIGN PATENT DOCUMENTS

CN 1477804 A 2/2004
CN 101217745 A 7/2008

OTHER PUBLICATIONS

European Patent Office, "Supplementary European Search Report", for EP 10 84 7715, Mar. 26, 2013.

* cited by examiner

*Primary Examiner* — Bob Phunkulh
(74) *Attorney, Agent, or Firm* — Christopher L. Parmelee; Walker & Jocke

(57) ABSTRACT

The present invention discloses a scheduling method in a code division multiple access system and single-mode chips, which method comprises the following steps: a single-mode chip of a terminal respectively calculating a paging slot and a paging frequency point of two subscribers with different international mobile subscriber identities of this terminal; doubling the length of a current paging period of each subscriber in the situation that the paging slots are the same and the paging frequency points are different; and scheduling two subscribers to monitor alternately within the extended paging period. The present invention facilitates the achievement of double treats in the CDMA system.

19 Claims, 6 Drawing Sheets

SCHEDULING METHOD IN A CODE DIVISION MULITPLE ACCESS SYSTEM AND SINGLE-MODE CHIPS

FIELD OF THE INVENTION

The present invention relates to the communication field, and in particular to a scheduling method in a code division multiple access (abbreviated as CDMA) system and single-mode chips.

BACKGROUND OF THE INVENTION

In the CDMA2000 1X system, code division multiple access mode is used between physical channels, and different physical channels use different Walsh codes. All the physical channels under the same cell use a common PN short code, the common channels use a determined long code, and the dedicated channels use different long codes.

The same cell can use a carrier frequency which contains a plurality of different physical frequencies. In order to allocate channel resources rationally and high efficiently, an algorithm for the terminal to select the carrier frequency is defined in the 3rd Generation Partnership Project (abbreviated as 3GPP) 2 C.S0005 V3.0 protocol, in which the international mobile subscriber identity (abbreviated as IMSI) and the number of carrier frequencies are used as two operation parameters to obtain the frequency which is finally selected by the terminal.

3 Gpp2 C.S0005 V3.0 provides that the same frequency point can contain a plurality of different paging channels (7 at most) and rapid paging channels (3 at most). An algorithm for the terminal to select a paging channel sequential number or rapid paging channel sequential number is defined in 3 Gpp2 C.S0005 V3.0, in which the paging channel sequential number (or rapid paging channel sequential number) which is finally monitored by the terminal is obtained according to the IMSI and the number of paging channels (or the number of rapid paging channels).

In the CDMA system, as to the standby state, the terminal may work under two states, the non-slot state and the slot state. As to the non-slot state, the terminal monitors all the slots of the paging channel or rapid paging channel at the current frequency; as to the slot state, the terminal only demodulates a paging channel message (including a rapid paging channel message) in the slot which is agreed with the network and does not modulate in other slots, so that the object of saving batteries can be achieved. It is further needed to note that the subscriber will judge whether the network requires the terminal to monitor the rapid paging channel according to an overhead message sent by the network. If it is needed to monitor the rapid paging channel, then the subscriber will first demodulate relevant bits of the rapid paging channel under the slot state, and monitor the paging channel only in the situation that the paging indication bit is activated. If the network does not require monitoring the rapid paging channel, then it directly monitor the paging channel. The periods of monitoring the paging channel or rapid paging channel are both determined according to the method of taking the minimum among the subscriber slot cycle index (abbreviated as SCI) and the network maximum slot cycle index. The algorithm of the monitoring slot needs to be obtained by combining with the slot cycle index of the terminal and IMSI and the maximum slot cycle index of the network, according to the algorithm defined in 3 Gpp2 C.S0005 V3.0.

Rapid paging channel is defined in 3 Gpp2 C.S0005 V3.0. The terminal monitors a corresponding paging channel according to the paging indication bit, thus achieving the object of further saving the electricity of the terminal battery. The corresponding location algorithm of the paging indication bit is defined in 2.6.7 of 3 Gpp2 C.S0005 V3.0, and the paging indication location which needs to be monitored by the terminal can be obtained according to the subscriber IMSI, current system time, and the rate of paging channel.

Dual treats mobile phones (two GSM cards) of global system for mobile communication (abbreviated as GSM) have become very popular, and many GSM dual treats mobile phones can be found on the market. However, the situation of CDMA is different. Currently, still no mature CDMA dual treats solution appears, since the currently available CDMA mobile phone chip only contains one set of transmitter and receiver, while to achieve dual treats, the data of two subscribers needs to be monitored. According to the currently available CDMA protocol, it is limited that each receiver only has the capability of demodulating one frequency point. Therefore, achieving CDMA dual treats can be achieved only by the manner of setting two CDMA chips for scheduling.

The inventors have found that: currently, the single-mode chip only has the capability of demodulating one frequency point in one slot, therefore in the situation that dual treats are achieved on one single-mode chip, if the slots of these two subscribers are the same but the frequency points are different, then these two subscribers cannot demodulate the frequency points. This problem obstructs the implementation of dual treats in the CDMA system.

SUMMARY OF THE INVENTION

The present invention provides a scheduling method in a code division multiple access system so as to solve at least the above problems.

A scheduling method in a code division multiple access system is provided according to one aspect of the present invention, which method comprises the following steps: a single-mode chip of a terminal calculating a paging slot and a paging frequency point of two subscribers with different international mobile subscriber identities of this terminal respectively; doubling the length of a current paging period of each of the subscribers in the situation that the paging slots are the same and the paging frequency points are different; and scheduling the two subscribers to monitor alternately within the extended paging period.

Furthermore, the above method also comprises: the single-mode chip demodulating all corresponding paging channels of the two subscribers in the situation that both the paging slots and paging frequency points of the two subscribers are the same, so as to acquire corresponding paging messages of the two subscribers.

Furthermore, in the situation that both the paging slots and paging frequency points of the two subscribers are the same, if a rapid paging channel is started, the single-mode chip performs process for the two subscribers respectively.

Furthermore, the above method also comprises: the single-mode chip performing time-sharing monitor for the two subscribers in the situation that the paging slots of the two subscribers are different.

Furthermore, the step of the single-mode chip calculating a paging slot and a paging frequency point of two subscribers of the terminal respectively comprises: the single-mode chip calculating a corresponding paging slot and a corresponding paging period of the two subscribers respectively according to a minimum in slot cycle indexes and the international mobile subscriber identities of the two subscribers, wherein the minimum of the slot cycle indexes is the minimum among the slot indexes of the two subscribers and the maximum slot paging index acquired from a network.

Furthermore, before the single-mode chip calculating a paging slot and a paging frequency point of two subscribers of the terminal respectively, the terminal only uses one of the overhead messages of the two subscribers as a reference parameter and acquires the maximum slot paging index acquired from the network from the overhead message which is used as the reference parameter.

Furthermore, before the single-mode chip calculating a paging slot and a paging frequency point of two subscribers of the terminal respectively, the terminal only uses one of the overhead messages of the two subscribers as a reference parameter and acquires the maximum slot paging index acquired from the network from the overhead message which is used as the reference parameter.

Furthermore, the international mobile subscriber identities of the two subscribers are stored in the terminal or stored in two subscriber identity module cards in the terminal respectively.

A single-mode chip is also provided according to another aspect of the present invention, in which the single-mode chip is adapted to calculate a paging slot and a paging frequency point of two subscribers of a terminal respectively, double the length of a current paging period of each of the subscribers in the situation that the paging slots are the same and the paging frequency points are different, and schedule the two subscribers to monitor alternately within the extended paging period.

Furthermore, the single-mode chip is also adapted to demodulate all corresponding paging channels of the two subscribers and acquire corresponding paging messages of the two subscribers in the situation that both the paging slots and paging frequency points of the two subscribers are the same; and the single-mode chip is also adapted to perform time-sharing monitor for the two subscribers in the situation that the paging slots of the two subscribers are different.

A single-mode chip is also provided according to still another aspect of the present invention, comprising: a calculation module adapted to calculate a paging slot and a paging frequency point of two subscribers of a terminal respectively; a setting module adapted to double the length of a current paging period of each of the subscribers in the situation that the paging slots are the same and the paging frequency points are different; and a scheduling module adapted to schedule the two subscribers to monitor alternately within the extended paging period.

Furthermore, the single-mode chip can also comprise: a demodulation module adapted to demodulate all corresponding paging channels of the two subscribers and acquire corresponding paging messages of the two subscribers in the situation that both the paging slots and paging frequency points of the two subscribers are the same; and a time-sharing monitor module adapted to perform time-sharing monitor for the two subscribers in the situation that the paging slots of the two subscribers are different.

By the present invention, a single-mode chip is used to double the current paging period of each subscriber in the situation that the paging slots are the same but the paging frequency points are different and schedule the two subscribers to monitor alternately within the extended paging period, to solve the problem in relevant art that the single-mode chip can only demodulate one frequency point in one slot, thus preventing the CDMA system from achieving the dual treats. Thus dual treats can be achieved in the CDMA system.

BRIEF DESCRIPTION OF THE DRAWINGS

The drawings illustrated here provide a further understanding of the present invention and form a part of the present application. The exemplary embodiments of the present invention and the description thereof are used to explain the present invention without unduly limiting the scope of the present invention. In the drawings.

DETAILED DESCRIPTION OF THE EMBODIMENTS

The present invention will be described hereinafter in detail in conjunction with the drawings thereof and the embodiments. It is needed to note that the embodiments of the present application and the features in the embodiments can be combined with each other if there is no conflict.

Figure 1:
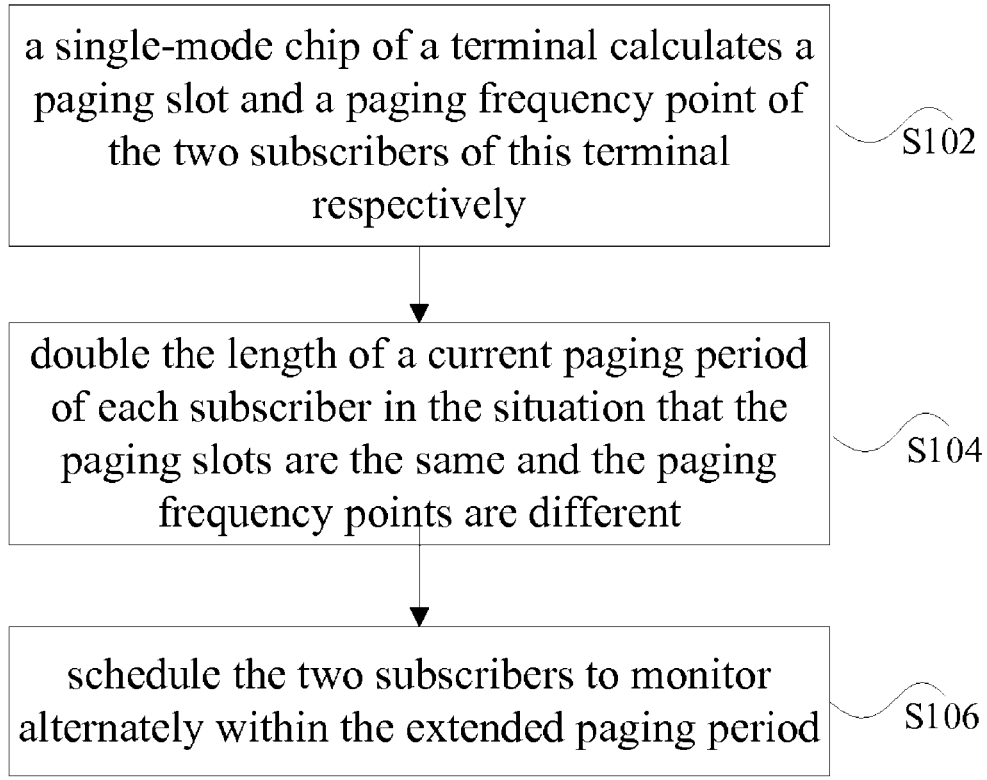
FIG. 1 is a flow chart of a method for achieving dual treats in a CDMA system according to the embodiment of the present invention.

FIG. 1 is a flow chart of a scheduling method for achieving dual treats in a CDMA system according to the embodiments of the present invention, which method comprises the following steps:

Step S102: a single-mode chip of a terminal calculates a paging slot and a paging frequency point of two subscribers with different international mobile subscriber identities of this terminal respectively;

Step S104: doubling the length of a current paging period of each subscriber in the situation that the paging slots are the same and the paging frequency points are different; and Step S106: scheduling the two subscribers to monitor alternately within the extended paging period.

By way of the above steps S102 to S106, the problem of how to monitor two subscribers of a single-mode chip in the situation that the paging slots are the same and the paging frequency points are different can be resolved, which thus facilitates the achievement of dual treats in the CDMA system to a great extent.

Preferably, the single-mode chip demodulates all corresponding paging channels of the two subscribers to acquire corresponding paging messages of the two subscribers in the situation that both the paging slots and paging frequency points of two subscribers are the same. Under this situation, if the rapid paging channel is started, then the two subscribers are processed respectively.

Figure 2:
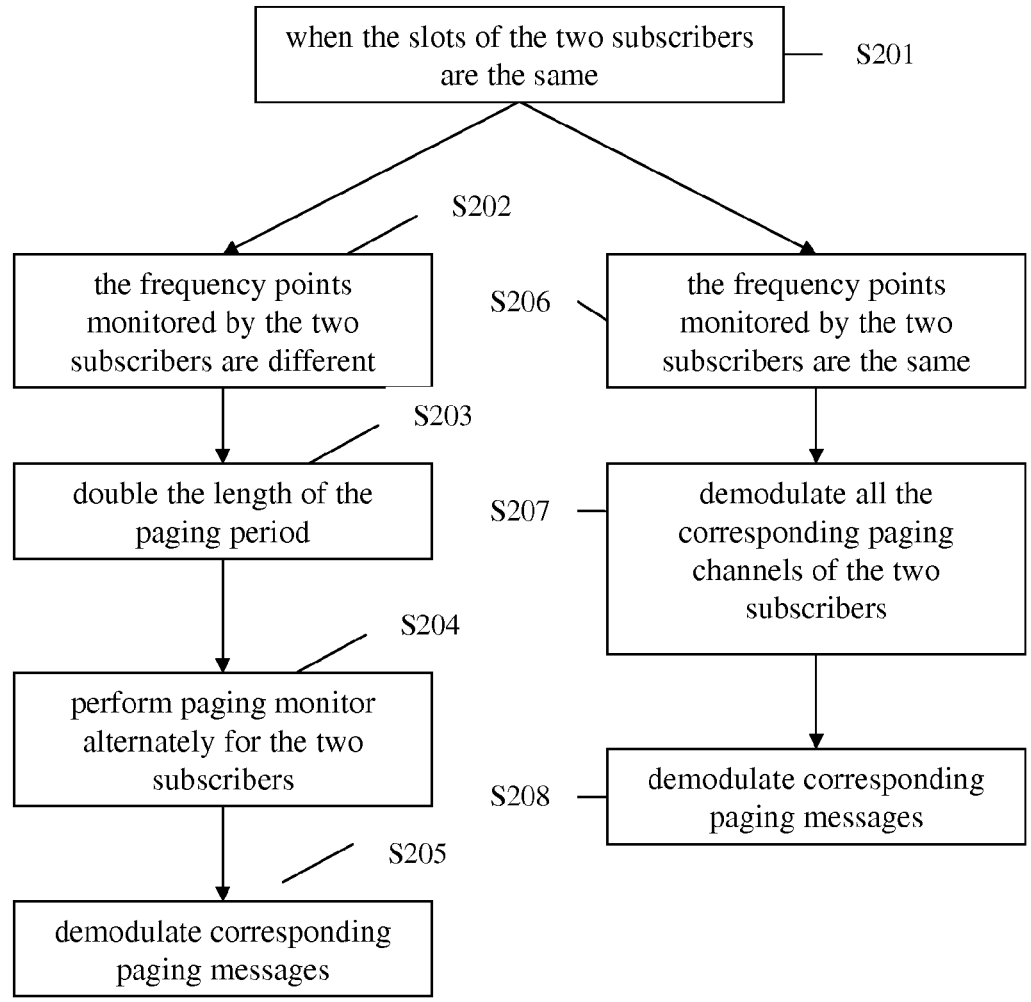
FIG. 2 is a flow chart of the process when the slots of two subscribers of a terminal are the same according to the embodiments of the present invention.

FIG. 2 is a flow chart of the process when the slots of two subscribers of a terminal are the same according to the embodiments of the present invention, which procedure includes the following steps:

Step S201: determining that the slots of the two subscribers are the same, and performing steps S202 to S205 and steps S206 to S208 respectively to the situation that the frequency points monitored by the two subscribers are different and the situation that they are the same;

Step S202: determining that the frequency points monitored by two subscribers are different;

Step S203: doubling the length of the current paging periods of the two subscribers;

Step S204: performing the paging monitoring on the two subscribers alternately;

Step S205: demodulating corresponding paging messages;

Step S206: determining that the frequency points monitored by the two subscribers are the same;

Step S207: demodulating all the corresponding paging channels of the two subscribers; and Step S208: demodulating the corresponding paging messages.

Figure 3:
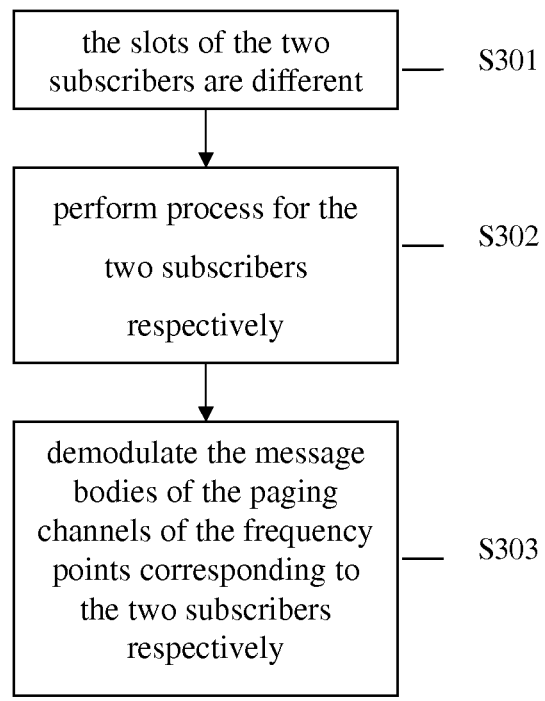
FIG. 3 is a flow chart of the process when the slots of two subscribers of a terminal are different according to the embodiments of the present invention.

Preferably, the single-mode chip performs time-sharing monitor on the two subscribers in the situation that the paging slots of two subscribers are different. FIG. 3 is a flow chart of the process when the slots of two subscribers of a terminal are different according to the embodiments of the present invention, which procedure includes the following steps:

Step S301: determining that the slots of the two subscribers are different;

Step S302: performing respectively the process as two subscribers; and

Step S303: demodulating the message bodies of the paging channels of the frequency points corresponding to the two subscribers respectively.

Figure 4:
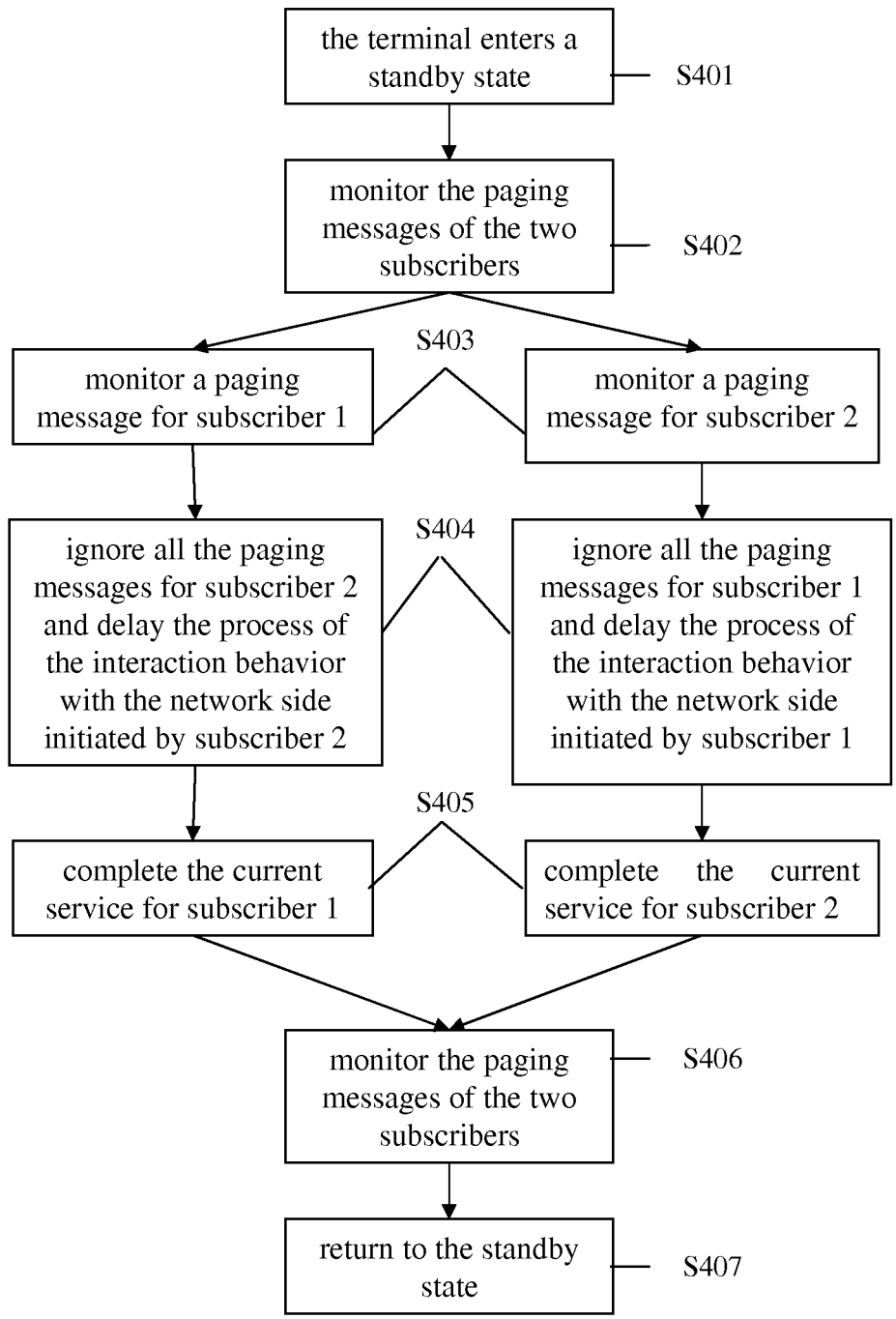
FIG. 4 is a flow chart of the process of the priority of a paging message of a terminal according to the embodiments of the present invention.

Preferably, after the terminal enters the standby state and the single-mode chip monitors a paging message of one subscriber in the two subscribers, the single-mode chip ignores a paging message of the other subscriber in the two subscribers, and delays the process of the interaction with the network initiated by the other subscriber till the single-mode chip completes the service process of the subscriber that received the paging message. FIG. 4 is a flow chart of the process of the priority of a paging message of a terminal according to the embodiments of the present invention, which procedure includes the following steps:

Step S401: the terminal enters the standby state;

Step S402: monitoring paging messages of the two subscribers;

Step S403: a paging message for subscriber 1 is monitored; in this step, it is also possible that a paging message for subscriber 2 is monitored first;

Step S404: if what is monitored in step S403 is the paging message for subscriber 1, then all the paging messages for subscriber 2 are ignored and the process of the interaction behavior with the network side initiated by subscriber 2 is delayed; and if what is monitored in step S403 is the paging message for subscriber 2, then all the paging messages for subscriber 1 are ignored and the process of the interaction behavior with the network side initiated by subscriber 1 is delayed.

Step S405: completing the current service of the subscriber the paging message of which is monitored;

Step S406: monitoring the paging messages of the two subscribers; and

Step S407: returning to the standby state.

Figure 5:
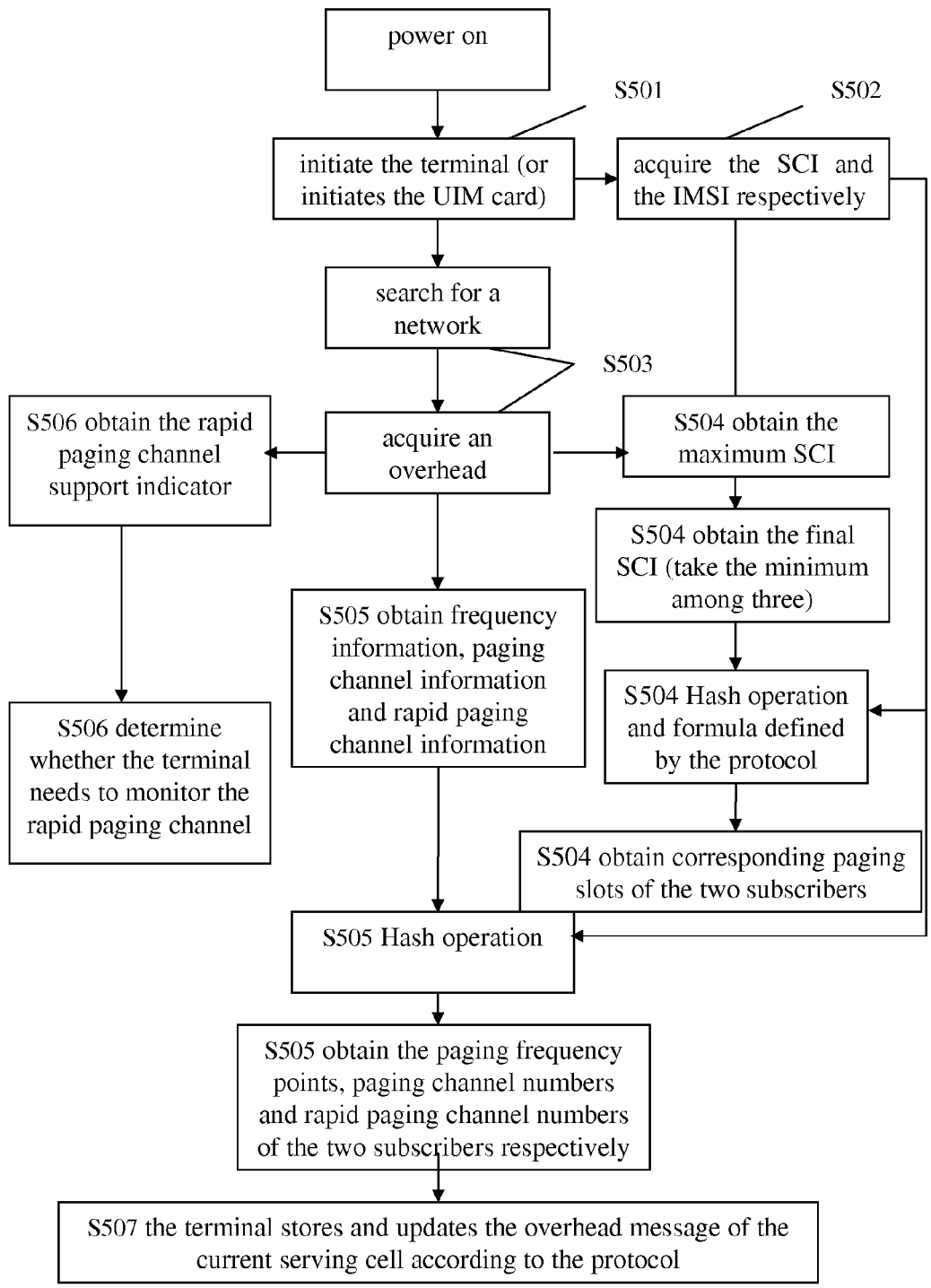
FIG. 5 is a flow chart of the initialization process of a terminal according to the embodiments of the present invention.

Preferably, the single-mode chip calculates the corresponding paging slot and paging period of the two subscribers respectively according to the minimum in the slot cycle index and the international mobile subscriber identities of two subscribers, in which the minimum in the slot cycle index is the minimum between the slot indexes of two subscribers and the maximum slot paging index acquired from the network. Since there are two subscribers in the terminal, in order to avoid the terminal from using both of the received two overhead messages as reference parameters, the terminal only uses one of the overhead messages of the two subscribers as a reference parameter and acquire the maximum slot paging index acquired from the network from the overhead message which is used as the reference parameter. FIG. 5 is a flow chart of the initialization process of a terminal according to the embodiments of the present invention, which procedure includes the following steps:

Step S501: the terminal is initiated, or initiates the user identity module (abbreviated as UIM) card;

Step S502: acquiring the SCI and the IMSIs of the two subscribers respectively;

Step S503: the terminal performs the network-searching process, acquires an overhead message, and performs steps S504, S505, and S506 after having acquired the overhead message wherein it is needed to note that the order to performing steps S504, S505, and S506 is not limited;

Step S504: obtaining the maximum SCI of the network, taking the minimum of the SCIs of two subscribers and the maximum SCI, and then performing Hash operation and formula operation defined by the protocol, and obtaining corresponding paging slots of the two subscribers;

Step S505: after having acquired the overhead message, obtaining the frequency information and paging channel information; and also the rapid paging channel information; and then performing Hash operation and obtaining the paging frequency points, paging channel sequential number and rapid paging channel sequential number of the two subscribers respectively;

Step S506: after having acquired the overhead message, obtaining the rapid paging channel support indicator, and then determining whether the terminal needs to monitor the rapid paging channel; and Step S507: the terminal stores and updates the overhead message of the current serving cell according to the protocol.

It is needed to note that the IMSIs of the two subscribers are stored in the terminal, or, stored in two UIM cards of the terminal respectively.

By way of the above steps, two different subscribers will monitor the same or different frequency points and monitor the same or different paging channels or rapid paging channels on the same or different slots, and the paging indication location of the rapid paging channel will also be at the same or different locations. As to the situation that the slots are different, the terminal adds the monitor of another subscriber on the basis of the slot working mechanism of the original single subscriber, which can complete the monitor of two slots by considering the situation of the neighboring slots and the radio frequency pre-working mechanism. As to the situation that the slots are the same and the monitored frequency points are different, then it is needed to alternately double the paging periods on the basis of the original paging period mechanism to achieve the object of monitoring two subscribers simultaneously. As to the situation that the slots are the same and the monitored frequency points are also the same, the terminal can directly demodulate the corresponding paging information of the two subscribers.

This embodiment will be described in detail in conjunction with preferred examples hereinafter, which comprises the following steps:

Step a: the terminal acquires the IMSIs and slot cycle indexes of the data of the two subscribers;

Step b: taking the minimum among the slot cycle indexes of the two subscribers and the maximum slot cycle index acquired from the network as the actually used slot cycle index;

Step c: calculating the corresponding paging frequency points of the two subscribers through the formula defined in 2.6.7 of 3 Gpp2 C.S0005 V3.0 according to the IMSI of the terminal and the number of serving cell frequency points acquired from the network;

Step d: calculating the corresponding paging slots of the two subscribers through the formulas defined in 2.6.7 and 3.6.2.1.3 of 3 Gpp2 C.S0005 V3.0 according to the IMSI of the terminal and the actually used slot cycle index calculated in step b;

Step e: determining whether the terminal uses the rapid paging channel according to whether the serving cell rapid paging channel acquired from the network is enabled;

Step f: calculating the corresponding paging channel sequential numbers of the two subscribers through the formula defined in 2.6.7 of 3 Gpp2 C.S0005 V3.0 according to the IMSI of the terminal and the number of paging channels acquired from the network;

Step g: if the network enables the rapid paging channel, then calculating the corresponding rapid paging channel sequential numbers of the two subscribers through the formula defined in 2.6.7 of 3 Gpp2 C.S0005 V3.0 according to the IMSI of the terminal and the number of rapid paging channels acquired from the network;

Step h: if the network enables the rapid paging channel, then calculating the corresponding paging indication locations of the two subscribers through the formula defined in 2.6.7 of 3 Gpp2 C.S0005 V3.0 according to the IMSI of the terminal and the paging channel rate acquired from the network;

Step i: the terminal updates and processes the overhead message by using the mode same as that for single subscriber, only keeping at the terminal side one set of overhead message which is used as the unique reference parameter wherein after a paging relevant message (including rapid paging indication) for one of the two subscribers is received and before this relevant service or procedure is ended, the other subscriber parameter is monitored any longer and the process of the interaction behavior (including but not limited to calling party, short message sending and registration) with the network initiated by the other subscriber is delayed till the service and procedure are ended;

Step j: when the paging slots obtained in step d are different, the terminal performs paging monitor ordering as the mode of two subscribers, which is similar to the time-sharing operation mode of two independent terminals;

Step k: when the paging slots obtained in step d are the same, it is needed to refer to the paging frequency point calculation result in step c; if the paging frequency points are also the same, then it goes to step m, and if the paging frequency points are different, then it goes to step l;

Step l: doubling the length of the paging period of single subscriber, and performing the monitoring alternately for the two subscribers wherein once the paging message of any of the two subscribers is found in the demodulated paging message bodies within any monitored slot, the terminal needs to perform process according to the principles provided in 3 Gpp2 C.S0005 V3.0 and step i;

Step m: demodulating all the corresponding paging channels of the two subscribers simultaneously wherein once the paging message of any of the two subscribers is found in the demodulated paging message bodies, the terminal needs to perform process according to the principles provided in 3 Gpp2 C.S0005 V3.0 and step i; and as to the situation that the rapid paging channel is enabled, it goes to step n; and Step n: as to the situation of rapid paging channel, regardless whether the corresponding rapid paging channels of the two subscribers are the same rapid paging channel, they are processed as two subscribers respectively, and the terminal needs to perform process according to the principles provided in 3 Gpp2 C.S0005 V3.0 and step i).

The following is an example of two phone numbers with two separated cards in one CDMA phone. Assume that the IMSI of subscriber 1 is x and SCI is 2; and the IMSI of subscriber 2 is y and SCI is 3. This procedure includes the following steps:

Step S1: the terminal starts up to acquire the data such as IMSI, SCI, etc. of subscriber 1; and at the same time acquire the data such as IMSI, SCI, etc. of subscriber 2;

Step S2: the terminal completes the searching of network according to the rules of the roaming list, demodulates a pilot channel and synchronization channel, and thus demodulates the paging channel;

Step S3: the terminal acquires the overhead message sent by the network, and the terminal keeps the real-time updating of overhead message according to 3 gpp2 C.S0005 V3.0;

Step S4: the terminal parses information such as frequency information, paging channel information, rapid paging channel information, rapid paging channel supporting situation, maximum slot cycle index, etc. in the overhead message;

Step S5: obtaining the final SCI as 1 according to SCI=2 of subscriber 1, SCI=3 of subscriber 2, and maximum slot cycle index (assumed as 1); and obtaining the paging slot of subscribers 1 and 2 as T1 and T2 respectively by calculation using the formulas defined in 2.6.7 and 3.6.2.1.3 of 3 Gpp2 C.S0005 V3.0 in conjunction with IMSI=x of subscriber 1 and IMSI=y of subscriber 2;

Step S6: obtaining the monitored frequency points monitored of two subscribers respectively as C1 and C2 by calculation using the formula defined in 2.6.7 of 3 Gpp2 C.S0005 V3.0 according to the frequency information and the IMSI of subscriber 1 and the IMSI of subscriber 2;

Step S7: obtaining the monitored paging channel sequential numbers (rapid paging channel sequential numbers) of the two subscribers respectively as P1 and P2 using the formula defined in 2.6.7 of 3 Gpp2 C.S0005 V3.0 according to the paging channel information (rapid paging channel information) and the IMSI of subscriber 1 and the IMSI of subscriber 2;

Step S8: when T1 is not equal to T2, the terminal performs process for two subscribers according to the time-sharing mode which can be understood as similar to the process for two terminals; and as to the process of paging messages, the procedure in FIG. 4 is referred to;

Step S9: when T1 is equal to T2, if C1 is not equal to C2, then the value of the actual SCI is 2 (double the length of "1"), and the terminal monitors subscribers 1 and 2 alternately; and as to the process of paging messages, the procedure in FIG. 4 is referred to; and Step S10: when T1 is equal to T2, if C1 is equal to C2, then corresponding channels of P1 and P2 are simultaneously demodulated; and as to the process of paging messages, the procedure in FIG. 4 is referred to.

The embodiments of the present invention also provide a single-mode chip, which single-mode chip is adapted to calculate a paging slot and a paging frequency point of the two subscribers of a terminal respectively, double the length of a current paging period of each of the subscribers in the situation that the paging slots are the same and the paging frequency points are different, and schedule the two subscribers to monitor alternately within the extended paging period.

Preferably, this single-mode chip is further adapted to demodulate all corresponding paging channels of the two subscribers and acquire corresponding paging messages of the two subscribers in the situation that the paging slots and paging frequency points of the two subscribers are the same; and the single-mode chip is further adapted to perform time-sharing monitor for the two subscribers in the situation that the paging slots of the two subscribers are different.

Figure 6:
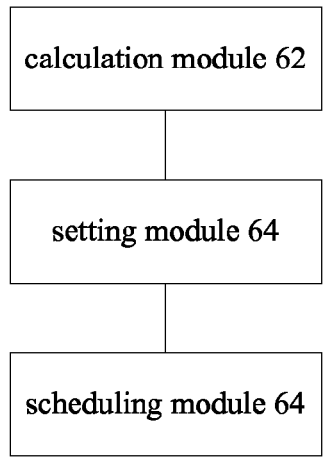
FIG. 6 is a block diagram of the structure of a single-mode chip according to the embodiments of the present invention.

The above single-mode chip also can use the structure shown in FIG. 6. As shown in FIG. 6, this single-mode chip can comprise: a calculation module 62, adapted to calculate a paging slot and a paging frequency point of the two subscribers of a terminal respectively; a setting module 64, coupled to the calculation module 62, adapted to double the length of a current paging period of each of the subscribers in the situation that the paging slots are the same and the paging frequency points are different; and a scheduling module 64, coupled to the setting module 64, adapted to schedule the two subscribers to monitor alternately within the extended paging period.

Figure 7:
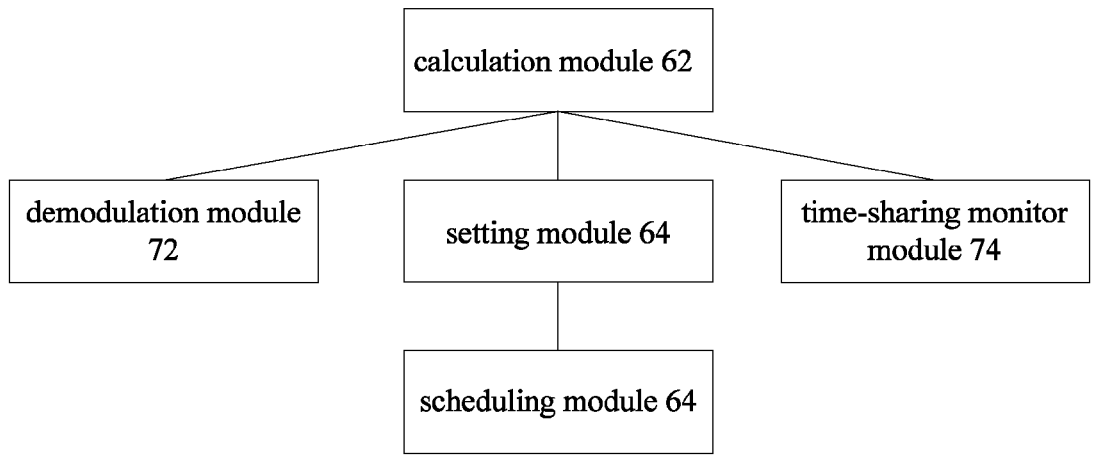
FIG. 7 is a block diagram of a preferred structure of a single-mode chip according to the embodiments of the present invention.

FIG. 7 is a block diagram of a preferred structure of a single-mode chip according to the embodiments of the present invention. As shown in FIG. 7, preferably, this single-mode chip can also comprise: a demodulation module 72, coupled to the calculation module 62, adapted to demodulate all corresponding paging channels of the two subscribers and acquire corresponding paging messages of the two subscribers in the situation that both the paging slots and paging frequency points of the two subscribers are the same; and a time-sharing monitor module 74, coupled to the calculation module 62, adapted to perform time-sharing monitor for the two subscribers in the situation that the paging slots of the two subscribers are different.

In summary, by way of the above embodiments of the present invention, the following technical effects can be achieved: reducing the cost of the CDMA dual treats and rapidly implementing dual treats terminals based on the currently available chips; on the basis of ensuring paging success rate, achieving the monitor of two subscribers; being adapted to various different CDMA1x environments; and being adapted to various services and procedures of the paging channel (rapid paging channel). The paging monitor of two subscribers at the same moment is achieved on the single-mode chip.

Apparently, those skilled in the art shall understand that the above modules and steps of the present invention can be realized by using general purpose calculating device, can be integrated in one calculating device or distributed on a network which consists of a plurality of calculating devices, and alternatively they can be realized by using the executable program code of the calculating device. Therefore, consequently they can be stored in the storing device and executed by the calculating device. In some cases the shown or described step can be performed in sequences other than those described herein. Or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A scheduling method in a code division multiple access system, comprising the following steps:
    a single-mode chip of a terminal calculating a paging slot and a paging frequency point of two subscribers with different international mobile subscriber identities of this terminal respectively;
    doubling the length of a current paging period of each of the subscribers in the situation that the paging slots are the same and the paging frequency points are different; and
    scheduling the two subscribers to monitor alternately within the extended paging period.

2. The method according to claim 1, wherein the method further comprises: the single-mode chip demodulating all corresponding paging channels of the two subscribers in the situation that both the paging slots and paging frequency points of the two subscribers are the same, so as to acquire corresponding paging messages of the two subscribers.

3. The method according to claim 2, wherein in the situation that both the paging slots and paging frequency points of the two subscribers are the same, if a rapid paging channel is started, the single-mode chip performs process for the two subscribers respectively.

4. The method according to claim 3, wherein the step of the single-mode chip calculating a paging slot and a paging frequency point of two subscribers of the terminal respectively comprises: the single-mode chip calculating a corresponding paging slot and a corresponding paging period of the two subscribers respectively according to a minimum in slot cycle indexes and the international mobile subscriber identities of the two subscribers, wherein the minimum of the slot cycle indexes is the minimum among the slot indexes of the two subscribers and the maximum slot paging index acquired from a network.

5. The method according to claim 3, wherein after the single-mode chip monitors a paging message of one subscriber in the two subscribers, the single-mode chip ignores paging messages of the other subscriber in the two subscribers, and delays the process of the interaction with the network initiated by the other subscriber till the single-mode chip completes the service process of the subscriber that received the paging message.

6. The method according to claim 2, wherein the step of the single-mode chip calculating a paging slot and a paging frequency point of two subscribers of the terminal respectively comprises: the single-mode chip calculating a corresponding paging slot and a corresponding paging period of the two subscribers respectively according to a minimum in slot cycle indexes and the international mobile subscriber identities of the two subscribers, wherein the minimum of the slot cycle indexes is the minimum among the slot indexes of the two subscribers and the maximum slot paging index acquired from a network.

7. The method according to claim 6, wherein before the single-mode chip calculating a paging slot and a paging frequency point of two subscribers of the terminal respectively, the terminal only uses one of the overhead messages of the two subscribers as a reference parameter and acquires the maximum slot paging index acquired from the network from the overhead message which is used as the reference parameter.

8. The method according to claim 2, wherein after the single-mode chip monitors a paging message of one subscriber in the two subscribers, the single-mode chip ignores paging messages of the other subscriber in the two subscribers, and delays the process of the interaction with the network initiated by the other subscriber till the single-mode chip completes the service process of the subscriber that received the paging message.

9. The method according to claim 1, wherein the method further comprises: the single-mode chip performing time-sharing monitor for the two subscribers in the situation that the paging slots of the two subscribers are different.

10. The method according to claim 9, wherein the step of the single-mode chip calculating a paging slot and a paging frequency point of two subscribers of the terminal respectively comprises: the single-mode chip calculating a corresponding paging slot and a corresponding paging period of the two subscribers respectively according to a minimum in slot cycle indexes and the international mobile subscriber identities of the two subscribers, wherein the minimum of the slot cycle indexes is the minimum among the slot indexes of the two subscribers and the maximum slot paging index acquired from a network.

11. The method according to claim 5, wherein after the single-mode chip monitors a paging message of one subscriber in the two subscribers, the single-mode chip ignores paging messages of the other subscriber in the two subscribers, and delays the process of the interaction with the network initiated by the other subscriber till the single-mode chip completes the service process of the subscriber that received the paging message.

12. The method according to claim 1, wherein the step of the single-mode chip calculating a paging slot and a paging frequency point of two subscribers of the terminal respectively comprises: the single-mode chip calculating a corresponding paging slot and a corresponding paging period of the two subscribers respectively according to a minimum in slot cycle indexes and the international mobile subscriber identities of the two subscribers, wherein the minimum of the slot cycle indexes is the minimum among the slot indexes of the two subscribers and the maximum slot paging index acquired from a network.

13. The method according to claim 12, wherein before the single-mode chip calculating a paging slot and a paging frequency point of two subscribers of the terminal respectively, the terminal only uses one of the overhead messages of the two subscribers as a reference parameter and acquires the maximum slot paging index acquired from the network from the overhead message which is used as the reference parameter.

14. The method according to claim 1, wherein after the single-mode chip monitors a paging message of one subscriber in the two subscribers, the single-mode chip ignores paging messages of the other subscriber in the two subscribers, and delays the process of the interaction with the network initiated by the other subscriber till the single-mode chip completes the service process of the subscriber that received the paging message.

15. The method according to claim 1, wherein the international mobile subscriber identities of the two subscribers are stored in the terminal or stored in two subscriber identity module cards in the terminal respectively.

16. A single-mode chip, wherein the single-mode chip is adapted to calculate a paging slot and a paging frequency point of two subscribers of a terminal respectively, double the length of a current paging period of each of the subscribers in the situation that the paging slots are the same and the paging frequency points are different, and schedule the two subscribers to monitor alternately within the extended paging period.

17. The single-mode chip according to claim 16, wherein the single-mode chip is further adapted to demodulate all corresponding paging channels of the two subscribers and acquire corresponding paging messages of the two subscribers in the situation that both the paging slots and paging frequency points of the two subscribers are the same; and the single-mode chip is further adapted to perform time-sharing monitor for the two subscribers in the situation that the paging slots of the two subscribers are different.

18. A single-mode chip, comprising:
a calculation module adapted to calculate a paging slot and a paging frequency point of two subscribers of a terminal respectively;
a setting module adapted to double the length of a current paging period of each of the subscribers in the situation that the paging slots are the same and the paging frequency points are different; and
a scheduling module adapted to schedule the two subscribers to monitor alternately within the extended paging period.

19. The single-mode chip according to claim 18, wherein the single-mode chip further comprises:
a demodulation module adapted to demodulate all corresponding paging channels of the two subscribers and acquire corresponding paging messages of the two subscribers in the situation that both the paging slots and paging frequency points of the two subscribers are the same; and
a time-sharing monitor module adapted to perform time-sharing monitor for the two subscribers in the situation that the paging slots of the two subscribers are different.

* * * * *

UNITED STATES PATENT AND TRADEMARK OFFICE
CERTIFICATE OF CORRECTION

PATENT NO.       : 8,670,445 B2                           Page 1 of 1
APPLICATION NO.  : 13/259628
DATED            : March 11, 2014
INVENTOR(S)      : Zitao Xue et al.

It is certified that error appears in the above-identified patent and that said Letters Patent is hereby corrected as shown below:

Title page, Item (86) PCT No.:
Replace "PCT/CN2010/007511" with --PCT/CN2010/075111--.

Signed and Sealed this
Sixteenth Day of September, 2014

Michelle K. Lee
*Deputy Director of the United States Patent and Trademark Office*